United States Patent Office 3,399,179
Patented Aug. 27, 1968

3,399,179
DECARBOXYLATION OF ORGANIC CARBOXYLIC ACIDS AND ACID SALTS WITH FLUORINE TO FORM ORGANIC FLUORINE COMPOUNDS
Vytautas Grakauskas, Arcadia, Calif., assignor to Aerojet-General Corporation, Azusa, Calif., a corporation of Ohio
No Drawing. Filed Jan. 3, 1963, Ser. No. 249,116
38 Claims. (Cl. 260—92.1)

This invention relates to a novel method of directly replacing one or more carboxyl groups in organic compounds by fluorine atoms. This direct replacement is conducted in the presence of an inert moderator. It is the primary object of this invention to provide a method whereby a —COOH group in an organic carboxylic acid or mixture of such acids may be directly replaced by a fluorine atom.

It is another object of this invention to prepare organic fluoro compounds in a novel manner. It is still another object of this invention to fluorinate organic carboxy compounds in a more selective and controllable manner. These and other objects of this invention will be apparent from the detailed description which follows.

The novel process of this invention involves the direct replacement of carboxyl groups by fluorine atoms by the fluorination of organic compounds containing at least one terminal carboxy or carboxylic acid salt grouping of the formula

wherein M is hydrogen or any metal cation. The carboxy group is attached to the balance of the organic compound as shown in the following formula

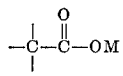

The free valences of the above group may be satisfied by essentially any substituted or unsubstituted monovalent or polyvalent organic radical. The exact nature of the organic portion of the molecule is not critical since the fluorination reaction occurs at the site of the carboxy group, to form the grouping

with hydrogen fluoride or metal fluoride salts and carbon dioxide being produced as by-products. It is to be understood that the organic compound which is fluorinated may contain several of these terminal carboxy groupings.

Likewise, in the case of polyvalent metals, several of the

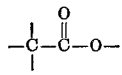

portions of the terminal group may be attached to a single metal cation through oxygen bonds. Thus, for example, when calcium is the cation, the terminal group of the compound to be fluorinated has the formula

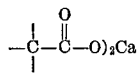

Fluorination of such a group yields two

groups.

The reaction between fluorine and organic compounds having at least one of the above-described terminal groups, i.e., an organic carboxylic acid or salt thereof, proceeds in accordance with the following general reaction equation:

(I)
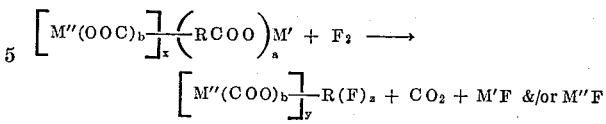

wherein R is a monovalent or polyvalent organic radical, M' is a metal cation or hydrogen; M" is a metal cation, hydrogen, or a nonionic ester forming radical, such as alkyl or aryl, preferably of 1 to about 20 carbon atoms; M'F and M"F are hydrogen fluoride, or a fluoride of the metal or metals M' and M"; $a$ and $b$ are small whole numbers of from 1 to about 4; $x$ and $y$ are integers of from 0 to about 3; and $z$ is an integer of from 1 to about 4. As can be seen, the sum of $y$ and $z$ equals $x+1$.

The above reaction scheme I includes the case where a monocarboxylic acid is decarboxylated, in which case $x$ and $y$ are zero. Also included is the reaction of a polycarboxylic acid or partial ester ($x$ equals 1 to about 3) to form: a completely decarboxylated fluoro compound ($y$=zero, and $z$ equals $x+1$); or a fluorinated carboxylic acid or ester thereof ($y$=1 to about 3). It can also be seen that the valency of R in the Equation I equals $x+1$ in the reactant, and $y+z$ in the product.

In the above equation, when M' and M" are hydrogen or metal cations, $a$ numerically equals the valence of M' and $b$ numerically equals the valence of M". Illustrative of the metal cations M suitable for use in the above reaction are the metals in Groups I-A and II-A of Period 2, Groups I-A, II-A, and III-A of Period 3; Groups I-A, II-A, III-A, IV-A, I-B, II-B, III-B, IV-B, V-B, VI-B, and VII-B of Period 4; Groups I-A, II-A, III-A, IV-A, V-A , I-B, II-B, III-B, IV-B, V-B, VI-B and VII-B of Period 5; Groups I-A, II-A, III-A, IV-A, V-A, VI-A, I-B, II-B, III-B, IV-B, V-B, VI-B and VII-B of Period 6; and all of the elements of Groups VII of the Periodic Table as it appears in the Handbook of Chemistry and Physics, 42nd edition, pp. 448 and 449. Specific examples of such metals are sodium, potassium, beryllium, magnesium, calcium, barium, titanium, zirconium, tin, lead, vanadium, antimony, bismuth, chromium, molybdenum, tungsten, manganese iron, cobalt, nickel, platinum, copper, silver, gold, mercury, cadmium, zinc, aluminum, etc.

Preferred metals are those in Periods 2–4, i.e., those elements having atomic members 3, 4, 11–13 and 19–32. More preferably M' and M" are alkali metal cations such as lithium, sodium, or potassium. When M' and M" are alkali metal cations, in Reaction I, above, both $a$ and $b$ are equal to one.

The metal cations M' and M", when these groups are metal, are normally introduced into the carboxylic acid reactant by treating the corresponding acid with the hydroxide of the metal cation. For example, the sodium ion is introduced by treating the corresponding carboxylic acid compound with sodium hydroxide. Similarly, the calcium, aluminum, potassium, and magnesium salts are obtained from the free acid by reaction with calcium hydroxide, aluminum hydroxide, potassium hydroxide and magnesium hydroxide, respectively.

As has been indicated above, R in the above reaction equation can be any monovalent or polyvalent organic radical. When R in Equation I is monovalent, $x$ is 0, and the carboxy-containing compound is a monocarboxylic acid of the formula $R_1$—$COOM_1$. The reaction proceeds simply by the replacement of the carboxy group by fluorine in accordance with the following equation:

(II)    $R_1COOM' + F_2 \rightarrow R_1F + M'F + CO_2$ wherein M' and M'F are as defined above, and $R_1$ is a substituted or unsubstituted hydrocarbyl or monovalent heterocyclic radical, preferably having from 1 to about 20 atoms. Monocarboxylic reactants which may be decarboxylated in accordance with the above reaction include saturated aliphatic monocarboxlic acid such as pentanoic, octanoic, undecanoic, hexadecanoic and acetic; aromatic monocarboxylic acids such as benzoic, pentachloro benzoic, cresotinic, pentamethyl benzoic, gallic, oxybenzoic, p-nitro benzoic, salicylic and toluylic; alicyclic monocarboxylic acids such as cyclopropanoic, cyclobutanoic, cyclopentanoic, cyclohexanoic, cycloheptanoic, chaulmoogric, norpinic, pinic, camphoric and truxillic; aliphatic ethylenically unsaturated monocarboxylic acids such as oleic, pentenoic, acrylic, octadecenoic and tetradecenoic; aliphatic acetylenic monocarboxylic acids such as pentynoic, octynoic, undecynoic; aliphatic hydroxy monocarboxylic acids such as hydroxystearic, ricinoleic, ricinstearolic, hydroxypentanoic, hydroxyoctanoic and hydroxytetradecanoic; and heterocyclic monocarboxylic acids such as furoic acid, cinchopen, α pyridine carboxylic acid, oxazole-4-carboxylic acid, nicotinic and pyrrole-3-carboxylic acid.

Typical of suitable hydrocarbyl radicals $R_1$ in the above Reaction II are alkyl radicals, alkenyl radicals, aryl radicals, cycloalkyl radicals, akaryl radicals and aralkyl radicals. Typical of suitable alkyl radicals are those having from 1 to about 20 carbon atoms, such as methyl, ethyl, propyl, dodecyl, eicosyl, etc. Preferred cycloalkyl radicals are cyclohexyl and cyclopentyl radicals. Illustrative aryl radicals are those having from 1 to about 12 carbon atoms such as phenyl, naphtyl, anthracyl, etc. Typical aralkyl and alkaryl radicals are benzyl and tolyl.

Suitable monovalent heterocyclic radicals are, for example, pyridyl, furyl, tetrazolyl, tetrazinyl, benzothiofuryl, thienyl, pyrryl, etc. Preferred monovalent heterocyclic radicals are those containing 5 or 6 atoms in the ring, 1 to 2 of which are nitrogen or oxygen atoms with the balance of the ring being carbon atoms.

It should be understood that any of the above-mentioned monovalent organic radicals may carry from 1 up to about 5 substituent groups such as nitro, amino, hydroxy, halogen, sulpho, etc.

These substituted radicals include nitroalkyl, aminoalkyl, nitroaryl, haloalkyl, haloaryl, hydroxy alkyl, etc. Typical of specific substituent-carrying radicals are the nitroethyl, methyol, ethylol, pentachlorophenyl, hydroxy phenyl, trifluoropropyl, 2-sulfoethyl, nitropyridyl, and 2,5-dichlorocyclohexyl groups.

In carrying out the process defined in Equation I, the fluorine and carboxylic acid or salt thereof are normally used in stoichiometrically equivalent amounts since this results in the most efficient utilization of the fluorine.

As is obvious from the foregoing, when $R_1$ is a substituted or unsubstituted, hydrocarbyl or heterocyclic radical in the above formula, typical compounds within the scope of $R_1F$ are 1-fluoro-ethane; 1-fluoro-2-sulfo-ethane; 1-fluoro-propane; 1-fluoro-ethanol; 1-fluoro-pentane; fluorocyclohexane; p-fluorotoluene; 1-fluoro-decane; fluoromethane; 4-fluoro-butyric acid; 5(fluoromethyl) tetrazole; o-fluorophenol; 2(fluoromethyl) pyridine; 2(fluoromethyl)-3,3-dibromopiperazine; fluorobenzene; p-fluoroaniline; p-fluorobenzene sulfonic acid; 1-fluoro-2-chloroethane and 2(fluoromethyl) furan.

In addition to those above-mentioned, other monocarboxylic acids which may be decarboxylated according to Equation II include those containing monovalent radicals which are interrupted by hetero-atoms such as sulfur, oxygen and nitrogen. These hetero-interrupted acids have the formula $$R_2(R_3-R_4)_mCOOM'$$

wherein $R_2$ is hydrocarbyl such as alkyl or aryl; $R_3$ is nitrogen

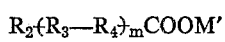

nitro-substituted nitrogen (nitraza), oxygen or sulfur, $R_4$ is alkylene or arylene, M' is as defined above, and $m$ is a small whole number of from 1 to about 5. Preferably, $R_2$ and $R_4$ contain from 1 to about 10 carbon atoms. The groups $R_2$ and $R_4$ may carry up to about 5 substituents such as nitro or halo, i.e., $R_2$ may be nitroalkyl, nitroaryl, haloalkyl, haloaryl, etc., and $R_4$ may be nitroalkylene, haloarylene, nitroarylene, etc.

The following is a typical acid compound containing a hetero oxygen atom:

$$CH_3-O-CH_2-CH_2-COOH$$

Illustrative of the acid compounds containing the hetero sulfur atom is the compound of the formula

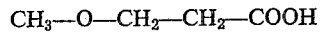

The compound sarcosine typifies those containing a

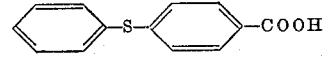

hetero nitrogen atom

Compounds prepared from the above-mentioned hetero-interrupted acids include 1-fluoro-2-methoxy ethane; 1-fluoro 3-thio-pentane; 1-fluoro-3-nitraza hexane; 1-fluoro-3-aza octane; 3-fluoro-propyl ether; and the like.

When R is a polyvalent organic radical in Reaction I, $x$ has a value of from 1 to 3, and the acid reactant is a polycarboxylic acid or salt, or partial ester thereof. The reaction proceeds in accordance with the following equation wherein R in Equation I is a polyvalent organic radical, represented in the following general equation by A:

III

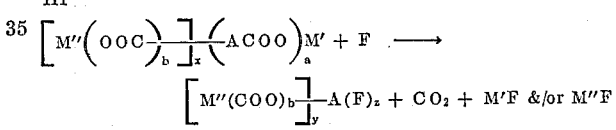

In this equation, M', M", $a$ and $b$ are as defined above, $x$ is an integer of from 1 to about 3, $y$ is an integer of from 0 to about 3, $z$ is an integer of from 1 to about 4, and A may be any polyvalent organic radical such as the divalent radicals; alkylene, arylene, or those having the following formula:

$$-E-R_3-E'-$$

wherein E, E' are alkylene, arylene, haloalkylene, haloarylene, nitroalkylene, or nitroarylene, and $R_3$ are nitrogen, nitraza, sulfur or oxygen. In addition, A may be a divalent heterocyclic radical. Likewise, A may be trivalent such as

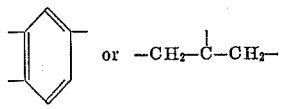

or tetravalent such as

and

As can be seen from general reaction Equation III, when A is divalent, $x$ equals 1; when A is trivalent, $x$ equals 2; and when A is tetravalent, $x$ equals 3. Preferably, A in the above equation is divalent. Any of the groups represented generically by A in the above formulas may carry substituents such as halogen, nitro, sulfo and hydroxy groups. Most preferably, the groups A, E and E' are lower alkylene, arylene, nitroalkylene, nitroarylene, haloalkylene and haloarylene; and contain from 1 to about 10 carbon atoms.

In the fluorinations of Equation III the proportions of the reactants are not critical. Normally the fluorine should be used in approximately stoichiometrically equivalent amount for each carboxyl group to be replaced. Thus, when a dicarboxylic acid is used, one mole of fluorine per mole of acid will produce a product in which the fluoromonocarboxylic acid predominates, with the by-products being one mole of hydrogen fluoride or metal fluoride and one mole of carbon dioxide. If two moles of fluorine are reacted per mole of dicarboxylic acid, the difluoro compound is the primary product, with two moles of hydrogen fluoride or metal fluoride and two moles of carbon dioxide as by-products.

Likewise, when tri- and tetra-carboxylic acids are employed, three and four moles of fluorine, respectively, will yield primarily trifluoro compounds in the former instance and tetrafluoro compounds in the latter case. Lesser amounts of fluorine will favor the production of monofluorodicarboxylic acids or difluoro monocarboxylic acids from tricarboxylic acids; and monofluorotricarboxylic acids, difluorodicarboxylic acids or trifluoromonocarboxylic acids from tetracarboxylic acids.

Alternatively, the extent of decarboxylation in polycarboxylic acids can be controlled by partial esterification of the acid prior to fluorination.

Thus, when a dicarboxylic acid is used and it is desired to favor the production of fluoromonocarboxylic acids, it is often advantageous to convert one of the carboxylic groups to a nonionic ester prior to the reaction with fluorine. Such a nonionic ester group will survive fluorination, in order to produce a fluorinated ester. The fluorinated ester thus obtained can then be hydrolyzed to the corresponding acid by reaction with a strong mineral acid such as sulfuric, hydrochloric, phosphoric or trifluoroacetic, to yield a fluorocarboxylic acid. The partial esters are obtained, preferably by reacting a stoichiometric amount of an alcohol, such as methanol or propanol, for each carboxy group to be esterified. The partial esterification reaction between the polycarboxylic acid and the lower alkanol can be carried out over a wide range of temperatures, and preferably within the range of from about 25° C. to about 160° C. The partial ester produced in the process of esterification will, in some cases, be admixed with minor amounts of free polycarboxylic acids and/or polyesterified material. Separation to obtain the free partial ester can be carried out in conventional manner by fractionation, distillation, or crystallization.

Illustrative of compounds produced in accordance with Reaction III, from polycarboxylic acids by replacement of all the carboxy groups are:

1,5-difluoropentane;
2,2'-difluoro diethylamine;
difluoromethane;
difluorobenzene;
1,8-difluorooctane;
3,4-difluoropyridine;
1,10-difluorodecene;
1,6-difluorohexyne;
1,4-difluorocyclobutane;
1,3,5-trifluorobenzene;
1,2,4,5-tetrafluorobenzene;
1,5-difluoro-3-thio pentane;
1,2-difluoroethylene;
2,7-difluoronaphthalene;
1,10-difluorodecane; and
α,α'-difluoro-p-xylene.

Compounds such as fluoroacetic acid may be obtained by partial esterification of malonic acid, followed by fluorination and hydrolysis. The same result may be achieved directly by reacting one mole of fluorine with one mole of malonic acid. Following either of these procedures, p-fluorobenzoic acid can be obtained from terephthalic acid; 6-fluorocaproic acid from pimelic acid; and 9-fluoropelargonic acid from sebacic acid.

By following the procedures defined in Equation III, any of the following organic acids may be partial or wholly decarboxylated: Organic aliphatic and aromatic dicarboxylic acids such as succinic, pimelic, sebacic, truxillic, thapsic, fumaric, adipic, citracomic, glutaric, maloeic, malonic, tartaric, and heterocyclic dicarboxylic acids such as furan, 2,5-dicarboxylic acid, quinolinic acid and 3,4-pyridine dicarboxylic acid; phthalic, suberic, tartaric, dilinoleic; and polycarboxylic acids such as citric, pyromellitic, and furan-2,3,4,5-tetra-carboxylic acid.

In summary, the R radical in the products obtained by carrying out Reaction I, above, preferably are mono- or poly-valent organic radicals, the most desirable monovalent organic radicals being selected from the grouping consisting of

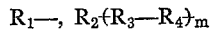

the most desirable divalent organic radicals being selected from the group consisting of alkylene, arylene, and

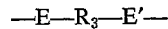

wherein R, $R_2$, $R_3$, $R_4$, E, E' and m are as previously defined and the most desirable polyvalent radicals are

and

The aforementioned reactions of this invention are carried out in a substantially inert moderator. The term "substantially inert" as used throughout the specification and claims is intended to include any moderator which is less reactive with fluorine than the carboxylic acid compound being decarboxylated.

The most suitable substantially inert moderators are those less than one quarter as reactive with fluorine as the acid compounds. The moderator of this invention is any polar or non-polar material in which the acid compound being decarboxylated is at least partially soluble. Thus, the moderator may be a complete solvent for the material being decarboxylated. Likewise, the moderator may be a material in which the acid compound forms only a partial suspension. Preferably, although not necessarily, the acid compound is soluble in the moderator at least to the extent of 1 part by weight per 100 parts of the moderator. Use of the moderator is an essential part of the decarboxylation reaction. The moderator serves not only as a carrier for the reaction but is also essential to the controlled decarboxylation of the acid compound.

I am not certain as to the exact mechanism by which the moderators control the decarboxylation. However, the moderator is known to serve as more than a carrier for the reactants since omission of the moderator results in rapid random fluorination of the acid compound to the extent of decomposition and contamination of the ultimate product. Further, the moderator promotes selective replacement of the carboxyl group with fluorine, i.e., the fluorination will occur only in the reactive carboxyl sites in the acid compound.

The specific moderator chosen is not critical and its selection depends upon such factors as cost, availability, inertness and solvent characterisitcs.

The preferred moderators are those polar and non-polar materials which are liquid within a temperature range of about −40° C. to about +40° C. This does not mean that the moderator must be liquid throughout this entire range. Rather, my preferred moderators are liquid over at least some portion of this range, that is, they have a normal melting point either below or within this range. Typical of the suitable moderators for use in the practice of this invention are the hydrocarbon alkanes and especially the hydrocarbon alkanes having from 5 to about 10 carbon atoms, such as pentane, hexane, octane, nonane and decane. Another group of suitable moderators are the haloalkanes having from 1 to about 8 carbon atoms, such as methylene dichloride, ethylene chloride, chloroform and carbon tetrachloride. Still another class of moderators are the aromatic hydorcarbons having from 6 to about 12 carbon atoms, such as benzene, toluene and the ortho, meta and para isomers of xylene. The chlorinated aromatic hydrocarbons containing 6 to 12 carbon atoms may also be used. Illustrative of these are monochlorobenzene and chlorotoluene.

Other suitable moderators include the aliphatic keytones, having the formula

and ethers having the formula

and the dialkyl substituted amides having the formula

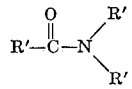

wherein in the above formula the R' groups are alkyl, and preferably lower alkyl having from 1 to about 10 carbon atoms, such as methyl, ethyl, pentyl and octyl. Specific ketones include dimethyl ketone and methyl, ethyl ketone. The ethers include dimethyl ether, diethyl ether and diisopropyl ether. The substituted amides include dimethyl formamide, diethyl formamide and dimethyl acetamide.

Still other moderators are water, the lower alkanols having from 1 to about 10 carbon atoms and the lower alkylene glycols having from 1 to about 10 carbon atoms. Suitable lower alkanols and alkylene glycols include methanol, ethanol, isopropanol, ethylene glycol, propylene glycol and butylene glycol.

Preferred among the foregoing moderators are the polar solvents such as water, the lower alkanols and the lower alkylene glycols.

It is to be understood that mixtures of any of the foregoing moderators may be employed in the practice of this invention. Water is the preferred moderator because of its low cost and ready availability. However, lower aliphatic alcohols such as methanol, ethanol, and isopropanol have been found to give very good results. It is surprising that the fluorination reaction can be carried out in lower aliphatic alcohols since the introduction of fluorine into the lower aliphatic alcohol would normally be expected to cause fires and explosions. Fluorination reactions of this invention were found to proceed very satisfactorily in the lower aliphatic alcohols.

The amount of the moderator employed is not critical. Normally the weight ratio of moderator to the acid compound being fluorinated is within the ratio from about 0.5 to about 200, and more preferably within the range from about 1.0 to about 20.

The temperature at which these fluorination reactions are carried out is not critical. Normally it is desirable to keep the temperature as low as possible when working with fluorine, and thus the preferred reaction temperature is between about $-40°$ C. and about $+40°$ C. More preferably the reaction is carried out between the temperature of about $-5°$ C. and $+5°$ C.

The fluorine gas used in this invention may be diluted with an inert gas such as helium or nitrogen so as to improve the control of the rate of fluorine addition.

The fluorinations of this invention may be carried out in any conventional reactor. However, for long reactor life, those portions of the reactor which come in contact with fluorine should be coated with material such as nickel or polyethylene.

The fluoro compounds or fluoro-carboxylic acids of this invention may be isolated in conventional manner, i.e., by filtration, crystallization, extraction and/or distillation.

Fluorination reactions in this invention may be carried out under any suitable pressure. Normally atmospheric pressure is used since it is most convenient. However, it may be sometimes desirable to conduct the fluorination under elevated pressure in order to increase the solubility of the fluroine in the moderator.

The examples which follow are presented only for the purposes of illustration and should not be regarded as limitative of the scope of our invention in any way. In the examples, percentages are by weight and gas volumes are at standard temperature and pressure unless otherwise indicated.

Example I.—Fluorination of sebacic acid salt

A stream of fluorine (2–3 liters/hr.) diluted with helium (10 liters/hr.) was passed into a solution of 50.5 g. sebacic acid (0.25 mole) in 450 ml. water containing 33 g. of 85 percent potassium hydroxide (0.6 mole KOH) at 25–30° C. After 60–70 minutes the originally clear solution became cloudy and some white solid began to precipitate. This solid material was sebacic acid and a few drops of concentrated aqueous potassium hydroxide were added to the reaction mixture to reconvert the acid to its potassium salt. The reaction was continued for a period of 6 hours and during this time 18–20 liters of fluorine gas were passed into the reaction mixture. Several times during the run sebacic acid separated again and additional alkali was added to the mixture from time to time to keep the acid in solution. The addition potassium hydroxide introduced into the reaction flask during the run amounted to 16.5 g. (0.25 mole).

At the end of the run the reaction mixture was acidified with 50 ml. of concentrated hydrochloric acid and the unreacted sebacic acid was removed by filtration. The filter cake was washed with several portions of methylene chloride and the acid was dried in a vacuum desiccator. The recovered sebacic acid amounted to 9.5 g.

The aqueous filtrate was combined with methylene chloride washings and the mixture was extracted with four 100-ml. portions of methylene chloride. The combined extracts were dried over anhydrous calcium chloride, filtered and concentrated at 40–60° C. to remove methylene chloride. The pale yellow liquid residue was distilled to yield, as a first fraction, 27 g. of colorless liquid, B.P. 30–40° C./0.2 mm. Hg and, as a second fraction, 3.5 g. of pale yellow liquid, B.P. 101–102° C./0.05–0.1 mm. Hg. The second fraction was identified by infrared analysis as 9-fluorononanoic acid. The colorless liquid of the first fraction was similarly identified as 1,8-difluorooctane, containing lesser amounts of 1,7 and 2,7-difluorooctanes.

Example II.—Fluorination of pimelic acid salt

A stream of fluorine (2–3 liters/hr.) diluted with helium (10 liters/hr.) was passed into a solution of 40 g. pimelic acid in 450 ml. water. containing 40 g. of 85 percent potassium hydroxide at 25–28° C. The reaction was continued for a period of 6 hours and during this time 12 liters of fluorine was introduced into the reaction mixture. The reaction mixture was worked up in the same manner as described in Example I. There was obtained 2.5 g. of colorless liquid, B.P. 50–52° C./20–25 mm., which is primarily 1,5-difluoropentane, and 4.5 g. of pale yellow liquid, B.P. 62–63° C./0.05–0.1 mm., which is 6-fluorohexanoic acid.

When the above example is repeated using ethylene glycol in lieu of water, and sodium hydroxide in lieu of potassium hydroxide, 6-fluorohexanoic acid is obtained.

Example III.—Fluorination of potassium glutarate

An aqueous solution of potassium glutarate prepared from 33 g. glutaric acid (0.25 mole) and 0.6 mole of potassium hydroxide was fluorinated in the manner described in Example I. 3.4 g. of 4-fluorobutyric acid, B.P. 62–64° C./2–3 mm. Hg was recovered from the reaction mixture.

When the above example is repeated using the monomethyl ester of glutaric acid and ethanol as the moderator, a fluorinated ester is obtained. Hydrolysis of this ester yields 4-fluorobutyric acid.

Example IV.—Fluorination of adipic acid salt

A stream of fluorine (2 liters/hr.) diluted with helium (10 liters/hr.) was passed into a solution of 29.2 g. adipic acid (0.2 mole) in 180 ml. water containing 0.3 mole of potassium hydroxide at 20–25° C. The reaction was continued for a period of 1.5 hours. 5-fluoropentanoic acid, 6.5 g. B.P. 59–60° C./0.1 mm., was isolated from the acidified reaction mixture in the manner described in Example I.

When the above example is repeated using benzene, dimethyl formamide and diethyl ether, successively, as the moderator in lieu of water, similar results are obtained.

Example V.—Fluorination of succinic acid salt

Potassium succinate prepared from 23.6 g. of succinic acid (0.2 mole) and 0.5 mole of potassium hydroxide in 450 ml. of water was fluorinated under the conditions described in Example I. The reaction was continued for a period of 3.5 hours and during this time 8–9 liters of fluorine were passed into the reaction mixture. The acidified reaction mixture was worked up in the manner described in Example I, and 1.2 grams of 3-fluoropropionic acid, B.P. 90° C./20 mm., Hg, was obtained.

When the above example is repeated using, first barium succinate, and then magnesium succinate, in lieu of potassium succinate, good yields of 3-fluoropropionic acid are obtained.

Example VI.—Fluorination of the sodium salt of p-nitrobenzoic acid

To about 500 ml. of water was added about 0.2 mole of the sodium salt of p-nitrobenzoic acid. Fluorination was carried out under the conditions described in Example I. The reaction was continued for about 4 hours during which time about 8 liters of fluorine gas were passed into the reaction mixture. The reaction mixture was worked up in the manner set forth in Example I. The product obtained was p-fluoro-nitrobenzene.

When the foregoing example is repeated using the sodium salt of o- nitrobenzoic acid, and ethanol as the moderator, a good yield of o-fluoro nitrobenzene is obtained.

Example VII.—Fluorination of the potassium salt of pyromellitic acid

To about 500 ml. of ethylene glycol is added about 0.1 mole of the potassium salt of pyromellitic acid. Fluorination is carried out under the conditions described in Example I. The reaction is continued for about 4–5 hours, during which period about 10 liters of gaseous fluorine is added. The reaction mixture is then worked up as in Example I, and a good yield of 1,2,4,5-tetrafluorobenzene is obtained.

The foregoing example is repeated using furan-2,3,4,5-tetracarboxylic acid in lieu of the salt of pyromellitic acid, and p-dichlorobenzene as the moderator. The product obtained is 2,3,4,5-tetrafluorofuran.

Example VIII.—Fluorination of the monoethyl ester of terephthalic acid

To about 500 ml. of ethylene dichloride is added about 0.1 mole of the monoethyl ester of terephthalic acid. Fluorination is carried out under the conditions described in Example I. After 4–5 hours, during which time about 6 liters of a 50/50 (by volume) mixture of fluorine and helium is added, the product is recovered in the manner described in Example I. Analysis shows the product to be p-fluorobenzoic acid methyl ester. Treatment of the ester with a stoichiometric amount of hydrochloric acid yields fluorobenzoic acid.

When the foregoing example is repeated using the monomethyl ester of malonic acid, fluoroacetic acid is obtained.

Example IX.—Fluorination of acrylic acid

To about 500 ml. of methanol is added about 0.2 mole of acrylic acid. Fluorination is carried out as in Example I, about 5 liters of fluorine being added. The product is isolated and identified as vinyl fluoride.

When the preceding example is repeated using the ferric salt of maleic acid, and hexane as the moderator, 1,2-difluoroethylene is obtained.

Example X.—Fluorination of sarcosine

One mole of sarcosine is fluorinated in about 10 liters of water. Fluorination is carried out for about 6 hours during which about 25 liters of fluorine is added. Isolation is performed as in Example I, and a good yield of 1-fluoro-2-azapropane is obtained.

In Table I which follows, the fluorination reaction and isolation procedures employed are as in Example I. In each case about 0.2 mole of carboxy compound are initially present together with about 500 ml. of moderator. Column 1 identifies the compound which is reacted with fluorine, in column 2 appears the moderator employed, in column 3 is amount of fluorine added, and in column 4 the primary product which is obtained.

TABLE I

| 1<br>Compound decarboxylated | 2<br>Moderator | 3<br>Liters of $F_2$ added (approx.) | 4<br>Product |
| --- | --- | --- | --- |
| o-Aminobenzoic acid | Water | 8 | o-Flurooaniline. |
| Oxazole-4-carboxylic acid | Ethanol | 8 | 4-fluorooxazole. |
| Cinnamic acid | Ethylene glycol | 8 | 1-phenyl-2-fluoro ethylene. |
| Chloroacetic acid | Methanol | 8 | Chloro-fluoro-methane. |
| Barium salt of o-toluic acid | Water | 8 | o-Fluoro-toluene. |
| 3,4-pyridine dicarboxylic acid | Diethyl ether | 15 | 3,4-difluoropyridine. |
| Truxillic acid | Water | 15 | 1,2-diphenyl-3,4-difluoro-cyclobutane. |
| Salicylic acid | Dimethyl acetamide | 8 | o-Fluorophenol. |
| Pentynoic acid | Water | 8 | 1-Fluorobutyne. |
| Hexadecanoic acid | Pentane | 8 | Fluoropentadecane. |

The compounds produced according to the invention are generally well-known in the art. These compounds have many uses which have been previously discovered. Thus, for example, the ethylenically unsaturated fluorides such as vinyl fluoride and 1,2-difluoroethylene are known monomers which can be readily polymerized to high polymers. The acetylenically unsaturated materials of this invention also undergo polymerization. Likewise, fluoroacetic acid is a widely used industrial acid, and the fluoroalkanes are commonly employed as lubricants. The monofluoromonocarboxylic and polyfluoromonocarboxylic acids may be reacted with alcohols to form plasticizers. The monofluorodicarboxylic, difluorodicarboxylic and trifluoromonocarboxylic acids may be reacted with complementary reactive materials to form polymeric esters, amides and the like. Such polymers find uses in coatings, moldings, and finishes.

The fluoro compounds of this invention containing nitro groups can be used as explosives in conventional manner. A compound of this type may be packed into the warhead of a missile, or absorbed on sawdust and then packed into the warhead. An example of such a missile is disclosed in the U.S. Patent No. 2,470,162, issued May 17, 1949. The charge prepared in the above manner can be caused to explode on operation of an impact or time fuse mechanism firing a detonating explosive such as lead azide. Similarly, the fluoro compounds of the invention containing the aza group can be converted to the corresponding nitramine by reaction with a nitrating agent such as nitric acid and this material used as an explosive in the above manner.

The fluorophenols of this invention can be reacted in conventional manner with aldehydes in acidic or basic solution to form resins. In general, the high molecular weight polyfluorinated materials of this invention are very useful as heat transfer agents in transformers and heat exchangers.

The decarboxylation reaction of this invention is also applicable to polymeric polyacid compounds. For example, polymers such as polyacrylic or polymethacrylic acid and copolymers of acrylic and/or methacrylic acid with ethylenically unsaturated monomers copolymerizable therewith such as methylmethacrylate, vinyl acetate and vinyl chloride may be partially or wholly decarboxylated by reaction with fluorine in the presence of any of the above mentioned substantially inert moderators. The polymers which are decarboxylated normally have a molecular weight of from about 5,000 up to about 5 million.

The amount of fluorine added will depend on the extent of decarboxylation desired. Thus, if for example, it is desired to completely decarboxylate the polymeric polyacid, at least one mole of fluorine should be added per carboxy group in the polyacid. If only partial decarboxylation is desired, less fluorine should be added. The conditions employed in decarboxylating polyacid polymers correspond generally to those set forth above in relation to the lower molecular weight mono- and polycarboxylic acids. Prior to reaction with fluorine, the carboxy group may optionally be converted to any of the metal salts, denoted above as M, by reaction with the corresponding metal hydroxide.

It can be seen that by the practice of this invention, polyacrylic acid may be converted to a polymer having a structure which is very similar to polyvinylfluoride.

Example XI.—Fluorination of polyacrylic acid

About 10 parts of commercial polyacrylic acid having a molecular weight of about one million is added to 500 parts of water. Then gaseous fluorine is slowly added while the temperature is maintained at about 10° F. The gas addition is continued until the evolution of carbon dioxide has nearly ceased. The water is then removed and the polymeric product obtained is analyzed and found to correspond closely to the structure of polyvinyl fluoride.

When the foregoing example is repeated using polymethacrylic acid in lieu of polyacrylic acid, similar results are obtained.

Having fully described the invention, it is intended that this invention be limited only by the lawful scope of the appended claims.

I claim:
1. The method of replacing the carboxy group with the fluoro group in organic carboxylic acids which comprises reacting fluorine with an organic compound containing at least one terminal group selected from the class consisting of carboxy groups and carboxylic acid salt groups, in the presence of a substantially inert normally liquid moderator.

2. The method of replacing the carboxy group with the fluoro group in organic carboxylic acids which comprises reacting fluorine with an organic compound containing at least one terminal group selected from the class consisting of carboxy groups and carboxylic acid salt groups, in the presence of a substantially inert normally liquid moderator selected from the group consisting of water, lower alkanols and lower alkylene glycols.

3. The method of replacing the carboxy group with the fluoro group in organic carboxylic acids which comprises reacting fluorine, with an organic compound containing at least one terminal group selected from the class consisting of carboxy groups and carboxylic acid salt groups, in the presence of water as a substantially inert moderator.

4. The method of replacing the carboxy group with the fluoro group in organic carboxylic acids which comprises reacting fluorine with an organic compound of the formula

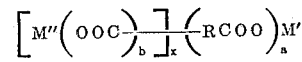

to form compounds of the formula

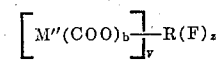

wherein the above formulae M' is selected from the group consisting of hydrogen and metal cations, M'' is selected from the group consisting of hydrogen, metal cations and nonionic ester-forming radicals, R is selected from the group consisting of monovalent and polyvalent organic radicals, a and b are small whole numbers of from 1 to about 4, x and y are integers from 0 to about 3 and z is an integer of from 1 to about 4; said reaction being carried out in the presence of a substantially inert normally liquid moderator.

5. The method of replacing the carboxy group with the fluoro group in organic carboxylic acids which comprises reacting fluorine with an organic compound of the formula

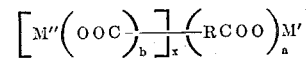

to form compounds of the formula

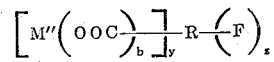

wherein in the above formulae M' is selected from the group consisting of hydrogen and metal cations, M'' is selected from the group consisting of hydrogen, metal cations and nonionic ester-forming radicals, R is selected from the group consisting of monovalent and polyvalent organic radicals, a and b are small whole numbers of from 1 to about 4, x and y are integers from 0 to about 3 and z is an integer of from 1 to about 4; said reaction being carried out in the presence of a substantially inert normally liquid moderator selected from the group consisting of water, the lower alkanols and lower alkylene glycols.

6. The method of replacing the carboxy group with the fluoro group in organic carboxylic acids which comprises reacting fluorine with an organic compound of the formula

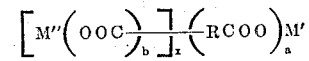

to form compounds of the formula

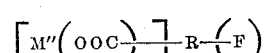

wherein in the above formulae M' is selected from the group consisting of hydrogen and metal cations, M'' is selected from the group consisting of hydrogen, metal cations and nonionic ester-forming radicals, R is selected from the group consisting of monovalent and polyvalent organic radicals, a and b are small whole numbers of from 1 to about 4, x and y are integers from 0 to about 3 and z is an integer of from 1 to about 4; said reaction being carried out in the presence of water as the substantially inert moderator.

7. The method of replacing the carboxy group with the fluoro group in organic monocarboxylic acids which comprises reacting fluorine with an organic monocarboxylic acid of the formula

R₁—COOM' wherein M' is selected from the group consisting of hydrogen and metal cations and R₁ is a monovalent organic radical selected from the group consisting of hydrocarbyl and heterocyclic, said monovalent radical containing from 1 to about 20 atoms, said reaction being carried out in the presence of a substantially inert normally liquid moderator.

8. The method of replacing the carboxy group with the fluoro group in organic monocarboxylic acids which comprises reacting fluorine with an organic monocarboxylic acid of the formula

R₁—COOM' wherein M' is selected from the group consisting of hydrogen and metal cations and R₁ is a monovalent organic radical selected from the group consisting of hydrocarbyl and heterocyclic, said monovalent radical containing from 1 to about 20 atoms, said reaction being carried out in the presence of a substantially inert normally liquid moderator, the substantially inert moderator being selected from the group consisting of water, lower alkanols and lower alkylene glycols.

9. The method of replacing the carboxy group with the fluoro group in organic monocarboxylic acids which comprises reacting fluorine with an organic monocarboxylic acid of the formula

R₁—COOM' wherein M' is selected from the group consisting of hydrogen and metal cations and R₁ is a monovalent organic radical selected from the group consisting of hydrocarbyl and heterocyclic, said monovalent radical containing from 1 to about 20 atoms, said reaction being carried out in the presence of water as a substantially inert moderator.

10. The method of replacing the carboxy group with the fluoro group in organic monocarboxylic acids which comprises reacting fluorine with an organic monocarboxylic acid of the formula

R₂(R₃—R₄)ₘ—COOM' wherein R₂ is hydrocarbyl, R₃ is selected from the group consisting of nitraza, aza, oxygen and sulfur, R₄ is selected from the group consisting of alkylene and arylene, M' is selected from the group consisting of hydrogen and metal cations and m is an integer of from 1 to about 5, said reaction being carried out in the presence of a substantially inert normally liquid moderator.

11. The method of replacing the carboxy group with the fluoro group in organic monocarboxylic acids which comprises reacting fluorine with an organic monocarboxylic acid of the formula

R₂(R₃—R₄)ₘ—COOM' wherein R₂ is hydrocarbyl, R₃ is selected from the group consisting of nitraza, aza, oxygen and sulfur, R₄ is selected from the group consisting of alkylene and arylene, M' is selected from the group consisting of hydrogen and metal cations and m is an integer of from 1 to about 5, said reaction being carried out in the presence of a substantially inert normally liquid moderator selected from the group consisting of water, lower alkanols and lower alkylene glycols.

12. The method of replacing the carboxy group with the fluoro group in organic monocarboxylic acids which comprises reacting fluorine with an organic monocarboxylic acid of the formula

R₂(R₃—R₄)ₘ—COOM' wherein R₂ is hydrocarbyl, R₃ is selected from the group consisting of nitraza, aza, oxygen and sulfur, R₄ is selected from the group consisting of alkylene and arylene, M' is selected from the group consisting of hydrogen and metal cations and m is an integer of from 1 to about 5, said reaction being carried out in the presence of water as a substantially inert moderator.

13. The method of replacing at least one carboxy group with the fluoro group in organic polycarboxylic acids which comprises reacting fluorine with an organic polycarboxylic acid compound of the formula $$\left[ M''\left(OOC\frac{\phantom{x}}{\phantom{x}}\right)_b \right]_x \left(ACOO\right)_a M'$$

wherein M' is selected from the group consisting of hydrogen and metal cations, M" is selected from the group consisting of hydrogen, metal cations and nonionic ester-forming radicals, a and b are small whole numbers of from 1 to about 4, x is an integer of from 1 to about 3 and A is a polyvalent organic radical, said reaction being carried out in the presence of a substantial inert normally liquid moderator.

14. The method of claim 13, wherein A is a divalent organic radical.

15. The method of claim 13 wherein A is a divalent organic radical selected from the group consisting of alkylene and arylene, said divalent organic radical containing from 1 to about 10 carbon atoms.

16. The method of replacing at least one carboxy group with the fluoro group in organic polycarboxylic acid which comprises reacting fluorine with an organic polycarboxylic acid compound of the formula $$\left[ M''\left(OOC\frac{\phantom{x}}{\phantom{x}}\right)_b \right]_x \left(ACOO\right)_a M'$$

wherein M' is selected from the group consisting of hydrogen and metal cations, M" is selected from the group consisting of hydrogen, metal cations and nonionic ester-forming radicals, a and b are small whole numbers of from about 1 to about 4, x is an integer of from 1 to about 3 and A is a divalent organic radical, said reaction being carried out in the presence of a substantially inert normally liquid moderator selected from the group consisting of water, lower alkanols and lower alkylene glycols.

17. The method of replacing at least one carboxy group with the fluoro group in an organic polycarboxylic acid which comprises reacting fluorine with an organic polycarboxylic acid compound of the formula $$\left[ M''\left(OOC\frac{\phantom{x}}{\phantom{x}}\right)_b \right]_x \left(ACOO\right)_a M'$$

wherein M' is selected from the group consisting of hydrogen and metal cations, M" is selected from the group consisting of hydrogen metal cations and nonionic ester-forming radicals, a and b are small whole numbers of from about 1 to about 4, x is an integer of from 1 to about 3 and A is a divalent organic radical, said reaction being carried out in the presence of water as a substantially inert moderator.

18. The method of preparing fluoroacetic acid which comprises reacting malonic acid with fluorine in the presence of a substantially inert normally liquid moderator.

19. The method of preparing fluoroacetic acid which comprises reacting malonic acid with fluorine in the presence of a substantially inert normally liquid moderator selected from the group consisting of water, the lower alkanols and the lower alkylene glycols.

20. The method of preparing fluoroacetic acid which comprises reacting malonic acid with fluorine in the presence of water as a substantially inert moderator.

21. The method of preparing a fluoroacetic acid which comprises reacting a malonic acid salt with fluorine in the presence of a substantially inert normally liquid moderator.

22. The method of preparing fluoroacetic acid which comprises reacting a malonic acid salt with fluorine in the presence of a substantially inert normally liquid moderator selected from a group consisting of water, lower alkanols and lower alkylene glycols.

23. The method of preparing fluoroacetic acid which comprises reacting a malonic acid salt with fluorine in the presence of water as a substantially inert moderator.

24. The method of preparing fluoroacetic acid which comprises reacting a half ester of malonic acid with fluorine in the presence of a substantially inert normally liquid moderator to obtain the methyl ester of fluoroacetic acid and then reacting the said ester with a strong mineral acid to form the fluoroacetic acid.

25. The method of preparing fluoroacetic acid which comprises reacting a half ester of malonic acid with fluorine in the presence of a substantially inert normally liquid moderator selected from the group consisting of water, lower alkanols, and lower alkylene glycols.

26. The method of preparing fluoroacetic acid which comprises reacting a half ester of malonic acid with fluorine in the presence of water as a substantially inert moderator to obtain the methyl ester of fluoroacetic acid and then reacting the said ester with a strong mineral acid to form the fluoroacetic acid.

27. The method of preparing vinyl fluoride which comprises reacting acrylic acid with fluorine in the presence of a substantially inert normally liquid moderator.

28. The method of preparing vinyl fluoride which comprises reacting acrylic acid with fluorine in the presence of a substantially inert normally liquid moderator selected from the group consisting of water, lower alkylene glycols and lower alkanols.

29. The method of preparing vinyl fluoride which comprises reacting acrylic acid with fluorine in the presence of water as a substantially inert moderator.

30. The method of preparing vinyl fluoride which comprises reacting an acrylic acid salt with fluorine in the presence of a substantially inert normally liquid moderator.

31. The method of preparing vinyl fluoride which comprises reacting an acrylic acid salt with fluorine in the presence of a substantially inert normally liquid moderator selected from the group consisting of water, lower alkylene glycols and lower alkanols.

32. The method of preparing vinyl fluoride which comprises reacting an acrylic acid salt with fluorine in the presence of water as a substantially inert moderator.

33. The method of replacing the carboxy group with the fluoro group in organic carboxylic acids which comprises reacting fluorine with an organic carboxylic acid compound of the formula

to form a compound of the formula

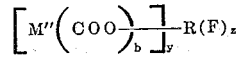

wherein in the above formulae M' is selected from the group consisting of metal cations and hydrogen, M" is selected from the group consisting of hydrogen, metal cations and nonionic ester-forming radicals, R is selected from the group consisting of monovalent and polyvalent organic radicals, $a$ and $b$ are small whole numbers of from 1 to about 4, $x$ and $y$ are small whole numbers of from 0 to about 3, and $z$ is an integer of from 1 to about 4, said reaction being carried out in the presence of a substantially inert normally liquid moderator selected from the group consisting of water, the lower alkanols and lower alkylene glycols, the reaction being conducted at a temperature of from about $-40°$ C. to about $+40°$ C., the weight ratio of said moderator to said carboxylic acid compound being fluorinated being from about 0.5 to about 200.

34. The method for the decarboxylation of polymeric polyacids which comprise reacting fluorine with a polymeric polyacid in the presence of a substantially inert normally liquid moderator.

35. The method of claim 34 wherein the polymeric polyacid is polyacrylic acid.

36. The method of claim 34 wherein the substantially inert moderator is water.

37. The method of preparing polyvinyl fluoride which comprises reacting polyacrylic acid having a molecular weight of from about 5,000 to about 5 million with about a stoichiometric amount of fluorine in the presence of a substantially inert normally liquid moderator selected from the group consisting of water, the lower alkanols and the lower alkylene glycols.

38. The method of claim 37 wherein the substantially inert moderator is water.

References Cited
UNITED STATES PATENTS 2,563,797  8/1951  Stedehouder _____ 260—539
2,176,181  10/1939  Hunsdiecker et al. ___ 260—487

OTHER REFERENCES

Grovenstein, Jr. E. and Ropp, G.A. Carbon-13 Isotope Fractionation as a Criterion of the Mechanism of Bromode Carboxylation of 3,5-dibromo-4-hydroxybenzoic Acid. In Journal of the American Chemical Society.

Surrey, A.R. Name Reactions in Organic Chemistry.

Hasek et al, Journal of the American Chemical Society, (vol. 82, pp. 843–51 Fed. 1960).

JOSEPH L. SCHOEFER, *Primary Examiner.*

J. A. DONAHUE, *Assistant Examiner.*